J. SLEPIAN.
LIQUID RHEOSTAT.
APPLICATION FILED APR. 18, 1919.
1,376,470.
Patented May 3, 1921.
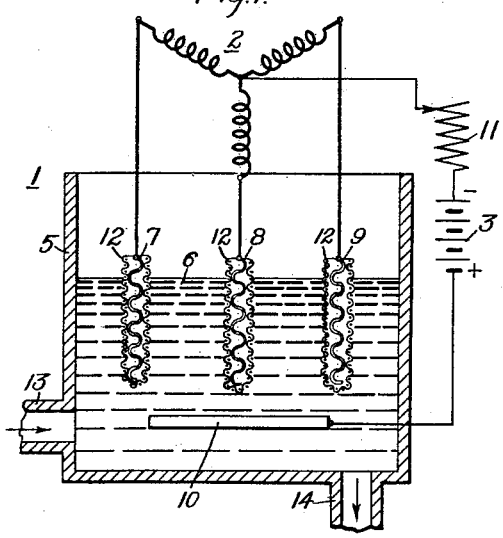
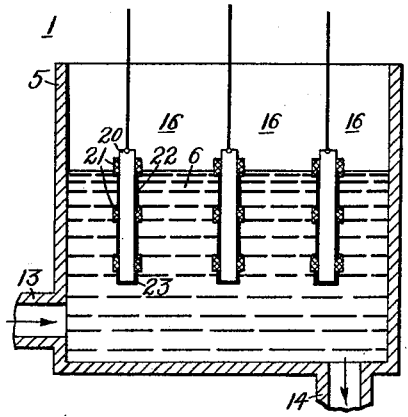
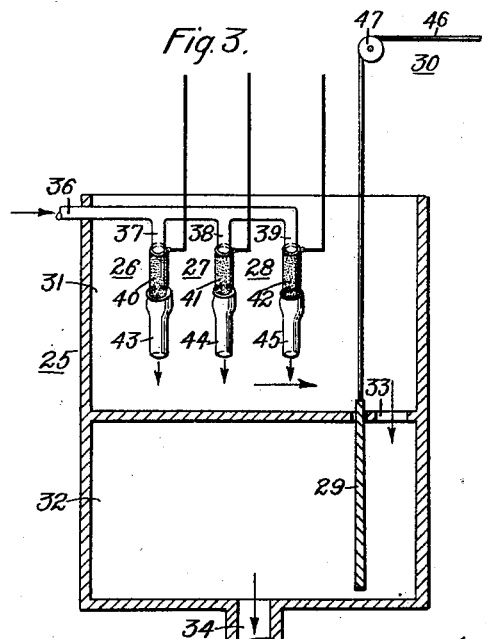
WITNESSES:
J. A. Helsel.
W. R. Coley
INVENTOR
Joseph Slepian.
BY
Wesley G. Carr
ATTORNEY

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

LIQUID-RHEOSTAT.

1,376,470.  Specification of Letters Patent.  Patented May 3, 1921.

Application filed April 18, 1919. Serial No. 291,156.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Liquid-Rheostats, of which the following is a specification.

My invention relates to liquid rheostats, and it has for its object to prevent the corrosion of electrodes, by sea-water, for example.

More specifically stated, one object of my invention is to provide porous insulating material applied to an electrode for certain protective purposes, such as preventing corrosion or over-heating of the electrode.

Another specific object of my invention is to provide a guarded electrode, of the type indicated, to prevent bodily removal of the electrode ions, together with means for counteracting the tendency of the ions to diffuse through the porous insulating cover for the electrode.

Other minor objects of my invention will become evident from the following detailed description, taken in conjunction with the accompanying drawing, wherein Figure 1 is a diagrammatic view of a liquid rheostat and various associated circuits constructed and arranged in accordance with my present invention.

Fig. 2 and Fig. 3 are diagrammatic views of modified forms of the invention.

Referring to Fig. 1 of the drawing, the system shown comprises a liquid rheostat 1 for regulating the current supplied to any desired circuit, such as the secondary or rotor winding 2 of an induction motor, together with an auxiliary source of energy, such as a battery 3, for supplying an additional current to the liquid rheostat for a purpose to be set forth later.

The liquid rheostat 1 may be of any suitable type and is here shown as comprising a tank or container 5 having an inlet opening 13 and an outlet opening 14 for supplying a continuous flow of electrolyte 6, as indicated by the arrows, through the agency of any suitable pumping means (not shown).

A plurality of electrodes 7, 8 and 9, which may conveniently take the form of corrugated iron, are connected to the outer terminals of the respective windings comprising the secondary member 2 of the induction motor to be controlled. The main electrodes 7, 8 and 9 occupy the customary vertical position, while an auxiliary horizontally-extending electrode 10 is located below the main electrodes and is connected in circuit with the battery 3 and an adjustable resistor 11 which is connected to the neutral or star-point of the secondary motor winding 2. Consequently, in addition to the main circuits that are completed through the main electrodes and the electrolyte 6, an auxiliary direct-current circuit likewise includes the respective motor windings and main electrodes, forming parallel circuits, the auxiliary electrode 10 being employed in common series relation with all three of the circuits.

Since the present invention is particularly adapted for use in connection with the electrical propulsion of battle-ships and the like, the most convenient electrolyte is the sea-water, which may be pumped directly from, and discharged into, the ocean. However, the use of sea-water as an electrolyte has been found to produce relatively rapid corrosion of the customarily employed metallic electrodes, and, consequently, I supply a plurality of cloth envelops 12, or other equivalent porous insulating coverings, for the respective electrodes 7, 8 and 9.

The envelops or wrappers 12 may be made from cotton duck, asbestos cloth, or other suitably strong textile material having a reasonable life.

From experiments made with respect to the solution contained within the cloth envelops during the operation of the rheostat, it appears to follow that the Fe ion goes into and out of solution while still remaining inside the porous container 12, which prevents the circulating sea-water 6 from carrying the Fe ions away bodily. To counteract the tendency of those ions to diffuse through the wrappers 12, the auxiliary electrode 10 and battery 3 are connected to impress upon the electrode circuits a constant positive potential relative to the neutral point of the electrodes 7, 8 and 9, whereby an auxiliary direct current is sent through all of the electrodes, in accordance with the previously traced circuits.

The cloth envelops 12 thus protect the metallic electrodes 7, 8 and 9 from corrosion, during the life of the covering material.

However, it has been found that the current density permissible at the surface of the main electrodes is limited by reason of the fact that vapor forms within the cloth wrapper, introducing a high resistance in circuit, and probably causing internal arcing, whereby the temperature of the electrode is raised to an injuriously high value.

Consequently, for high-current-capacity rheostats, to protect the electrodes from the effects of such high temperature, and also to prevent corrosion, I propose the structure that is shown in Fig. 2, which again comprises the rheostat 1, having the above mentioned circulation of sea-water 6, wherein a plurality of guarded electrodes 16 are immersed. Each electrode 16 comprises a metallic rod or plate 20, which is inclosed, at intervals, by wrappers 21 of porous material, which may be formed of cloth, porous clay, or a functional equivalent. Intermediate the several pairs of porous wrappers 21, thin insulating films 22 of rubber, or other non-porous material, are wrapped around the electrode 20, and a lower cap 23 may also be provided to complete the covering of the electrode, thus, as in the case of the system shown in Fig. 1 preventing direct contact of the body of liquid with the electrode.

The formation of high temperatures in the electrode 16 is prevented as follows: The current is carried from each electrode into the electrolyte through the porous wrappers 21 only, and the flow of electrolyte past the portions of the electrode that are covered by the non-porous insulating films 22 and 23 serves to satisfactorily cool the electrode throughout any desired operating range of current.

Referring to the form of my invention that is shown in Fig. 3, a liquid rheostat 25 comprises an electrode-containing compartment 31, which communicates with a lower discharge reservoir 32, through an opening 33 in the intermediate partition, a discharge opening 34 for the rheostat as a whole being provided in the bottom thereof.

A plurality of hollow or tubular electrodes 26, 27 and 28 are connected to the external circuit to be controlled. In the present case, the height of immersion of the electrodes is determined by a movable weir or dam 29, that may be actuated to any desired vertical position by means of a hand- or power-operated device 30.

For the purpose of supplying liquid to the rheostat, a supply pipe 36 enters near the top thereof and is provided with a plurality of branches 37, 38 and 39 that are inserted within the upper ends of the hollow electrodes 26, 27, and 28, respectively.

In the present instance, the electrodes proper comprise graphite cylinders 40, 41 and 42, which have a very high current-carrying capacity, provided the temperature thereof is maintained below a critical value; and, moreover, such electrodes are inherently free from susceptibility to corrosion. To provide liquid streams of variable length and, hence, also of variable resistance, a plurality of porous insulating tubes 43, 44 and 45, such as sections of a canvas hose, are applied to the lower ends of the electrodes to cover predetermined portions thereof; and, by varying the height of the liquid in the compartment 31, varying lengths of the hose are exposed, to correspondingly change the circuit resistance.

By causing the incoming electrolyte to flow through the hollow graphite electrodes, a material degree of cooling, therefore, is provided, in addition to that furnished by conduction and convection to the main body of liquid when the weir 29 is raised to a sufficient height to immerse the electrodes proper.

It will be understood that any well-known device may be employed for raising and lowering the movable weir 29 to correspondingly vary the height of immersion of the sections of canvas hose or of the electrodes proper. For illustrative purposes, a rope or cable 46, passing over a pulley or sheave 47, is shown here. In this way, gradual variation of the circuit resistance provided by the liquid rheostat 25 may be obtained.

I do not wish to be restricted to the specific circuit connections, structural details, or arrangement of parts herein set forth, as various modifications thereof may be made without departing from the spirit and scope of my invention. I desire, therefore, that only such limitations shall be imposed as are indicated in the appended claims.

I claim as my invention:

1. In a liquid rheostat, the combination with an electrode, of means composed of insulating material applied to the electrode for certain protective purposes.

2. In a liquid rheostat, the combination with an electrode, of porous insulating material applied to said electrode.

3. In a liquid rheostat, the combination with an electrode, of means for preventing the main body of liquid from making direct contact with a predetermined portion of said electrode.

4. In a liquid rheostat, the combination with an electrode, of an insulating covering for a certain part of said electrode.

5. In a liquid rheostat, the combination with an electrode, of a cloth envelop therefor.

6. In a liquid rheostat, the combination with an electrode, connected in a main circuit to be regulated, of means for preventing the main body of liquid from making direct contact with a predetermined portion of said electrode, an auxiliary electrode, and means for sending an auxiliary-circuit current through both electrodes.

7. In a liquid rheostat, the combination with an electrode, of a porous covering for said electrode to prevent bodily removal of the electrode ions, and means for counteracting the tendency of the ions to diffuse through said covering.

8. In a liquid rheostat, the combination with an electrode, connected in a main circuit to be regulated, a cloth wrapper for said electrode, an auxiliary electrode, and an auxiliary source of energy connected to send current through both electrodes.

In testimony whereof I have hereunto subscribed my name this 2nd day of April, 1919.

JOSEPH SLEPIAN.